UNITED STATES PATENT OFFICE.

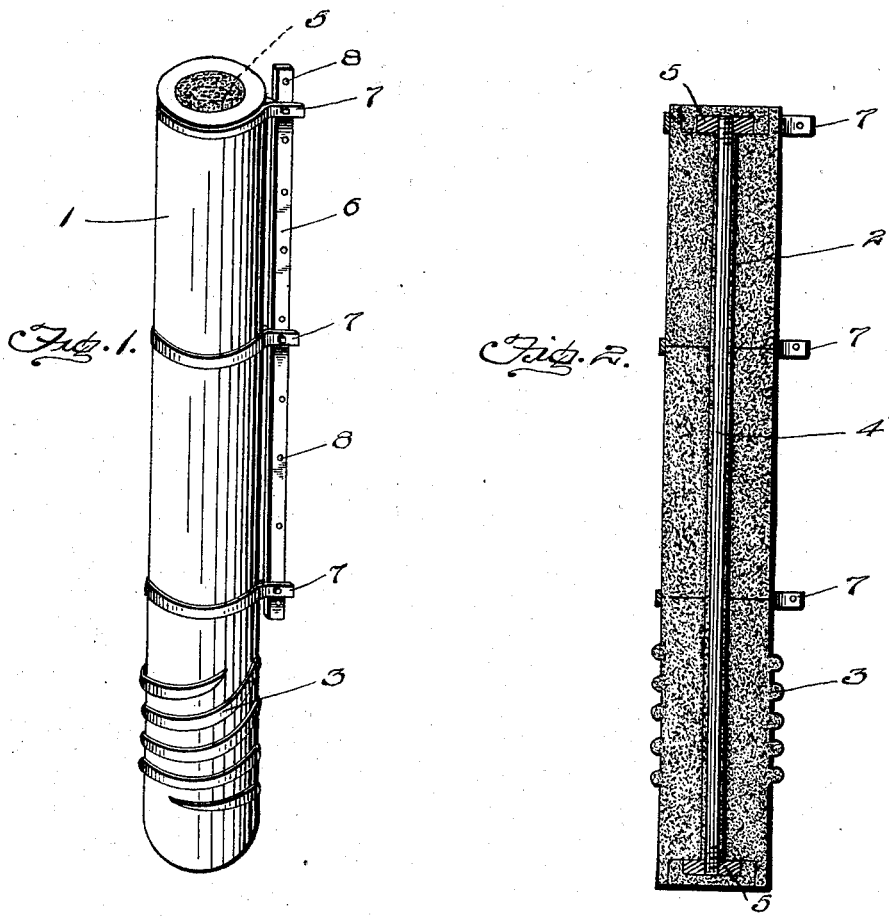

FRANK E. GREGORY, OF DEFIANCE, OHIO.

FENCE-POST.

SPECIFICATION forming part of Letters Patent No. 719,789, dated February 3, 1903.

Application filed May 29, 1902. Serial No. 109,488. (No model.)

*To all whom it may concern:*

Be it known that I, FRANK E. GREGORY, a citizen of the United States, residing at Defiance, in the county of Defiance and State of Ohio, have invented certain new and useful Improvements in Fence-Posts; and I do declare the following to be a full, clear, and exact description of the invention, such as will enable others skilled in the art to which it appertains to make and use the same.

The invention relates to fence-posts, and more particularly to that class of posts made of artificial stone in sections.

The object of the invention is to provide a fence-post of this character which shall be simple of construction, durable in use, comparatively inexpensive of production, and practically indestructible.

With this and other objects in view the invention consists of certain novel features of construction, combination, and arrangement of parts, which will be hereinafter more fully described, and particularly pointed out in the appended claim.

In the accompanying drawings, Figure 1 is a perspective view of my improved post, showing it completed; and Fig. 2 is a longitudinal vertical sectional view of the same.

Referring to the drawings, 1 denotes the sections of which the post is composed, each of which is provided with a central bore 2. The lower section is provided with a coarse thread 3, which after the post has been buried in the ground will securely hold it in place against strain applied to the post or against its being upheaved by frost in the ground. The lower end of the lower section and the upper end of the upper section constituting the post are provided with countersinks. A rod 4 extends through all the sections of the post and has screw-threaded ends, and upon these ends are screwed nuts 5, which are seated in the countersinks. After the rod has been inserted through the sections cement or a similar binder is poured or let into the alining holes in the sections around the rod and makes the rod and sections practically homogeneous. The nuts are now screwed upon the ends of the rod, and the countersinks at the ends of the upper and lower sections are filled with cement, thus covering over the ends of the rods and the nuts, and thus protecting the nuts and preventing the unscrewing of the same.

6 denotes a strip secured by clasps 7 to the post and provided with notches 8 to support the fence-wires.

From the foregoing description, taken in connection with the accompanying drawings, the construction, mode of operation, and advantages of the invention will be readily understood without requiring an extended explanation.

Various changes in the form, proportion, and details of construction may be made within the scope of the invention without departing from the spirit or sacrificing any of the advantages thereof.

Having now described my invention, what I claim, and desire to secure by Letters Patent, is—

A post consisting of a series of tubular sections, the upper and lower ends of which are provided with countersinks, a rod extending through said tubular sections and projecting into the countersinks, nuts screwed upon said rods and seated upon the base of the countersinks and covered by a filling of cement, clasps about the sections at their points of juncture, and a line-wire support carried by said clasps, substantially as described.

In testimony whereof I have hereunto set my hand in presence of two subscribing witnesses.

FRANK E. GREGORY.

Witnesses:
JNO. P. CAMERON,
TELLIS T. SHAW.